United States Patent
Salter et al.

(10) Patent No.: US 11,151,823 B2
(45) Date of Patent: Oct. 19, 2021

(54) MOTOR VEHICLE AND LOCKER ITEM TRANSFERRING METHOD AND ITEM TRANSFERRING SYSTEM

(71) Applicant: Ford Global Technologies, LLC, Dearborn, MI (US)

(72) Inventors: Stuart C. Salter, White Lake, MI (US); Kendra White, Redford, MI (US); David Brian Glickman, Southfield, MI (US); Kristopher Karl Brown, Dearborn, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 16/518,163

(22) Filed: Jul. 22, 2019

(65) Prior Publication Data
US 2021/0024292 A1    Jan. 28, 2021

(51) Int. Cl.
  *B65G 17/00* (2006.01)
  *G07C 9/00* (2020.01)
  *G06Q 10/08* (2012.01)
(52) U.S. Cl.
  CPC ..... *G07C 9/00896* (2013.01); *G06Q 10/0836* (2013.01)
(58) Field of Classification Search
  CPC .................................. B65G 17/00; G07C 9/00
  See application file for complete search history.

(56) References Cited

U.S. PATENT DOCUMENTS

| | | | |
|---|---|---|---|
| 9,573,684 B2 | 2/2017 | Kimchi et al. | |
| 9,911,341 B2 | 3/2018 | Soundararajan et al. | |
| 10,163,177 B2 | 12/2018 | Farris et al. | |
| 10,235,651 B2 | 3/2019 | Winkle et al. | |
| 10,538,190 B1 * | 1/2020 | Metellus | G08G 9/00 |
| 10,719,805 B2 * | 7/2020 | Ferguson | G06K 7/10722 |
| 2021/0130114 A1 * | 5/2021 | Salter | E05F 15/73 |

FOREIGN PATENT DOCUMENTS

WO    2016037219    3/2016

* cited by examiner

*Primary Examiner* — K. Wong
(74) *Attorney, Agent, or Firm* — David Coppiellie, Esq.; Carlson, Gaskey & Olds, P.C.

(57) ABSTRACT

A method of transferring an item between a motor vehicle and a locker can include extending an extension mechanism between a motor vehicle and a locker. The extension mechanism includes a conveyor system having an extension mechanism item carrying surface. The locker includes a conveyor system having a locker item carrying surface. The method assesses whether the motor vehicle is receiving an item from the locker, or transferring an item to the locker. When the item is to be transferred from the locker, the method positions the extension mechanism relative to the locker such that the extension mechanism item carrying surface is vertically lower than the locker item carrying surface. When the item is to be transferred from the motor vehicle, the method positions the extension mechanism relative to the locker such that the extension mechanism item carrying surface is vertically higher than the locker item carrying surface.

19 Claims, 5 Drawing Sheets

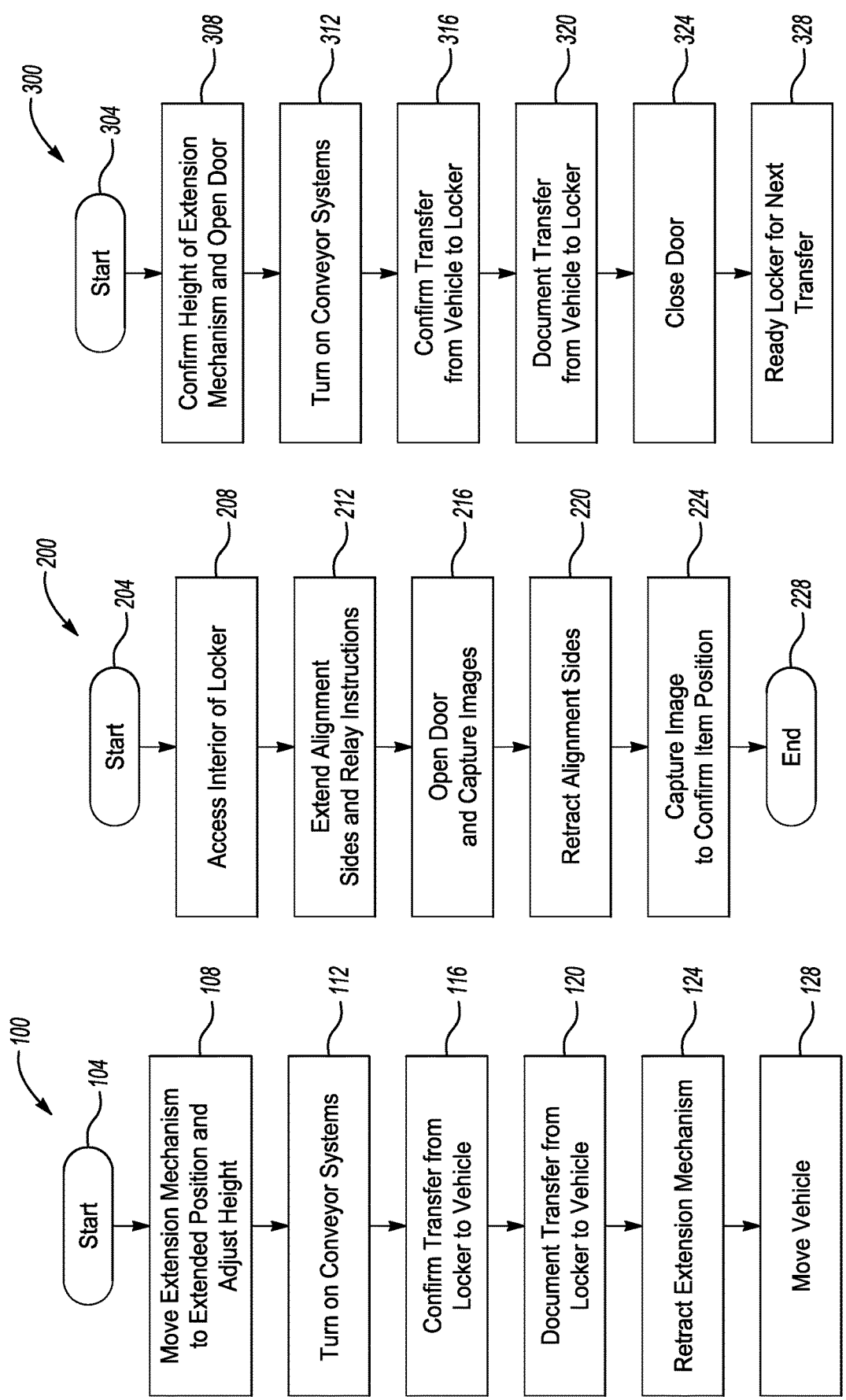

MOTOR VEHICLE AND LOCKER ITEM TRANSFERRING METHOD AND ITEM TRANSFERRING SYSTEM

TECHNICAL FIELD

This disclosure relates generally to transferring items between a motor vehicle, such as an autonomous motor vehicle, and a locker that is external to the motor vehicle.

BACKGROUND

Some vehicles, including autonomous vehicles, can deliver items to a locker. The vehicles can instead, or additionally, receive items from the locker. An extendable shroud can be used to transfer items between the locker and the vehicle.

SUMMARY

A method of transferring an item between a motor vehicle and a locker, according to an exemplary aspect of the present disclosure includes, among other things, extending an extension mechanism between a motor vehicle and a locker. The extension mechanism includes a conveyor system having an extension mechanism item carrying surface. The locker includes a conveyor system having a locker item carrying surface. The method assesses whether the motor vehicle is receiving an item from the locker, or transferring an item to the locker. When the item is to be transferred from the locker to the motor vehicle, the method positions the extension mechanism relative to the locker such that the extension mechanism item carrying surface is vertically lower than the locker item carrying surface. When the item is to be transferred from the motor vehicle to the locker, the method positions the extension mechanism relative to the locker such that the extension mechanism item carrying surface is vertically higher than the locker item carrying surface.

Another example of the foregoing method includes extending the extension mechanism from the motor vehicle to the locker.

Another example of any of the foregoing methods includes retracting at least one retractable alignment side within the locker and then transferring the item from the locker to the motor vehicle.

Another example of any of the foregoing methods includes, prior to the extending and assessing, receiving the item within the locker through a user opening of the locker. A user access door in a closed position blocks the user opening. The user access door in the open position reveals the user opening.

Another example of any of the foregoing methods includes capturing a picture of an individual placing the item within the locker using a camera that is mounted to the user access door.

Another example of any of the foregoing methods includes, after closing the user access door, using the camera to capture a picture of the item within the locker.

Another example of any of the foregoing methods includes extending the extension mechanism from the motor vehicle to the locker, retracting at least one retractable alignment side within the locker, and, after the retracting, transferring the item from the locker to the motor vehicle.

A method of transferring an item between a motor vehicle and a locker according to another exemplary aspect of the present disclosure includes, moving a user access door from a closed position to an open position. The user access door in the closed position blocks the user opening. The user access door in the open position reveals the user opening. The method includes receiving an item within a locker. The item is moved through the user opening in the locker when the user access door is in the open position. When the user access door is in the open position, the method uses a lens to capture an image of an individual placing the item in a locker. When the user access door is in the closed position, the method uses the lens to capture an image of the item within the locker.

Another example of the foregoing method includes aligning the item within the locker using at least one retractable alignment side of the locker.

In another example of any of the foregoing methods, the lens is mounted to user access door and is configured to move with the user access door back and forth between the open position and the closed position.

Another example of any of the foregoing methods includes operating a conveyor system of the locker to move the item from the locker to a conveyor of an extension mechanism that extends from a motor vehicle.

In another example of any of the foregoing methods, the conveyor of the extension mechanism is aligned relative to the locker such that an item receiving surface of the conveyor of the extension mechanism is vertically lower than an item delivering surface of the conveyor of the locker.

An item transferring system according to yet another exemplary embodiment of the present disclosure includes an extension mechanism that can extend between a motor vehicle and a locker. A conveyor system of the extension mechanism has an extension mechanism item transferring surface. The extension mechanism is automatically aligned relative to the locker such that, when an item is to be transferred from the locker to the motor vehicle, the extension mechanism item carrying surface is vertically lower than a locker item carrying surface of a conveyor system of the locker. When the item is to be transferred from the motor vehicle to the locker, the extension mechanism item carrying surface is vertically higher than the locker item carrying surface.

Another example of the foregoing system includes the extension mechanism as part of the motor vehicle.

In another example of any of the foregoing systems, the motor vehicle is an autonomous motor vehicle.

Another example of any of the foregoing systems includes the locker and at least one retractable alignment side of the locker.

Another example of any of the foregoing systems includes the locker, at least one user access door of the locker, and at least one lens mounted to the user access door. When the user access door is in an open position, the lens is configured to capture an image of an individual placing the item in a locker. When the user access door is in a closed position, the lens is configured to capture an image of the item within the locker.

In another example of any of the foregoing systems, the user access door in the closed position blocks the user opening, and the user access door in the open position reveals the user opening.

Another example of any of the foregoing systems includes the locker and at least one retractable alignment side of the locker.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 10 illustrates a flow of an exemplary method of transferring an item from a locker to a motor vehicle.

FIG. 11 illustrates a flow of an exemplary method of preparing an item for transfer from the locker to the motor vehicle.

FIG. 12 illustrates a flow of an exemplary method of transferring an item from a motor vehicle to a locker.

DETAILED DESCRIPTION

This disclosure relates generally to transferring an item between a motor vehicle and a locker. The motor vehicle can be an autonomous vehicle.

Figure 1:
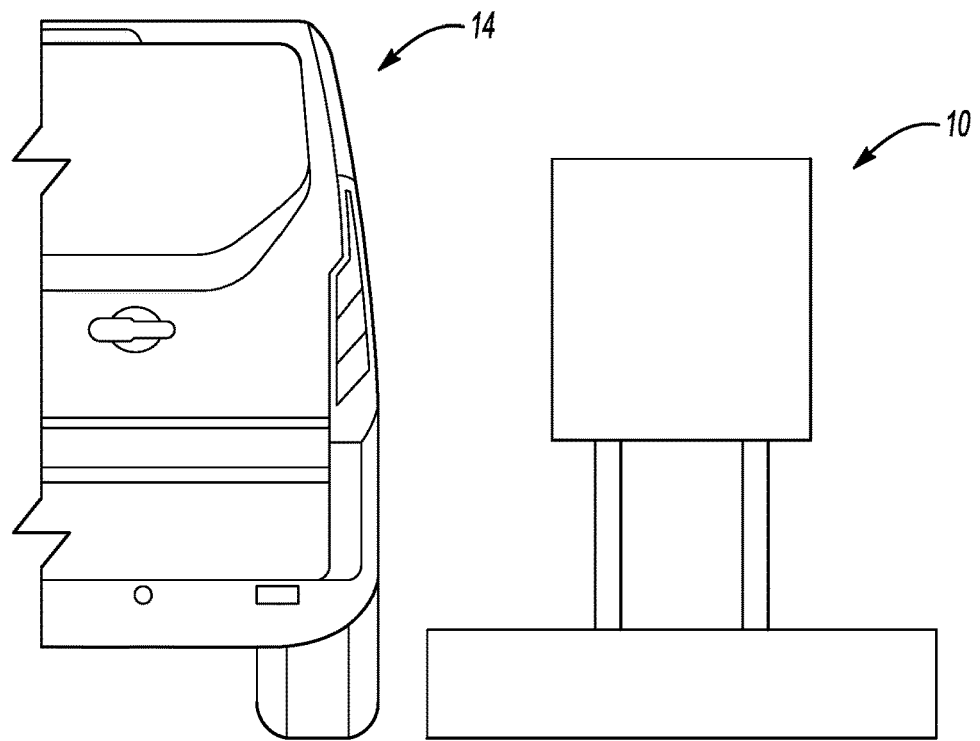
FIG. 1 illustrates a motor vehicle parked adjacent a locker.

Referring to FIG. 1, a locker 10 can receive an items from a motor vehicle 14, which is an autonomous motor vehicle in this example. The motor vehicle 14 can deliver the items to the locker 10 and then drive away from the locker 10. The items can be stored within the locker 10 until retrieved by a user.

In some examples, the vehicle 14 can receive items transferred from the locker 10. The user can, for example, deposit an item within the locker 10, which is then picked up by the motor vehicle 14.

Figure 2:
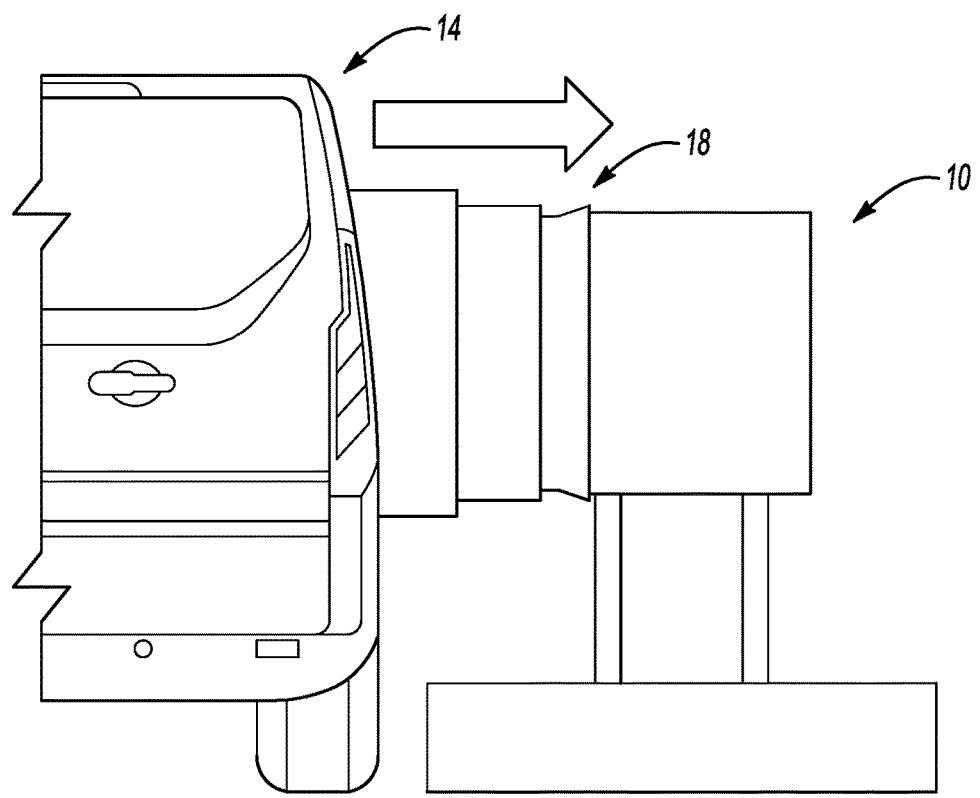
FIG. 2 illustrates an extension mechanism extending between the motor vehicle and the locker of FIG. 1.

FIG. 2 illustrates an extension mechanism 18 utilized to transfer items between the locker 10 and the vehicle 14. In the exemplary embodiment, the extension mechanism 18 extends from the vehicle 14. Keeping the extension mechanism 18 within the vehicle 14 can, among other things, reduce costs associated with the locker 10 as actuating mechanism and electronics are primarily within the vehicle 14. However, in other examples, some or all of the extension mechanism 18 could be part of the locker 10.

Figure 3:
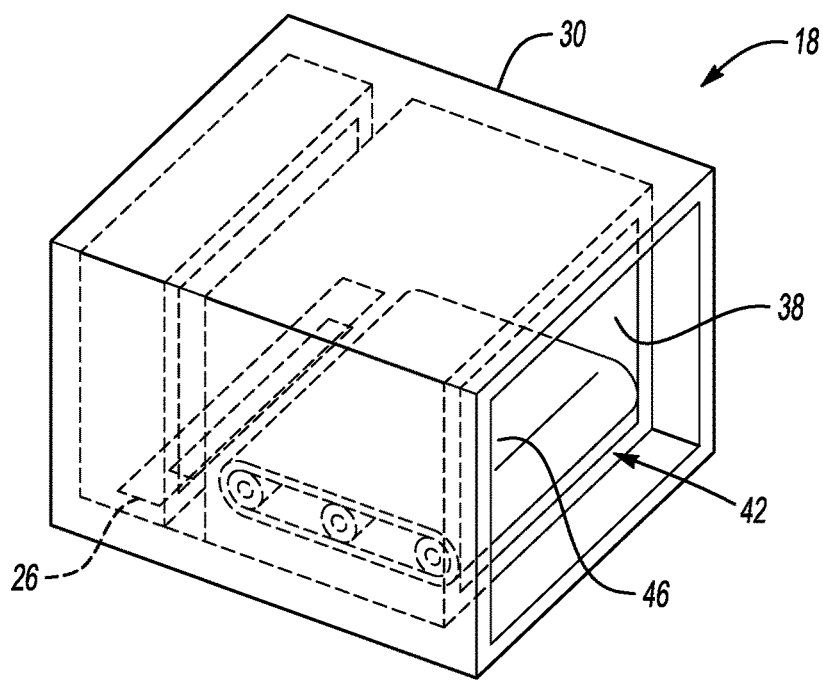
FIG. 3 illustrates a perspective view of the extension mechanism of FIG. 2 in a retracted position.

With reference now to FIG. 3 and continued reference to FIG. 2, the extension mechanism 18 is shown in a retracted position. The extension mechanism 18 can be in the retracted position when the vehicle 14 is driven. After the vehicle 14 is positioned near the locker 10, as shown in FIG. 1, the extension mechanism 18 can extend from the position of FIG. 3 to the position of FIG. 4 to place an item 22, here a package, in close proximity of the locker 10.

Figure 4:
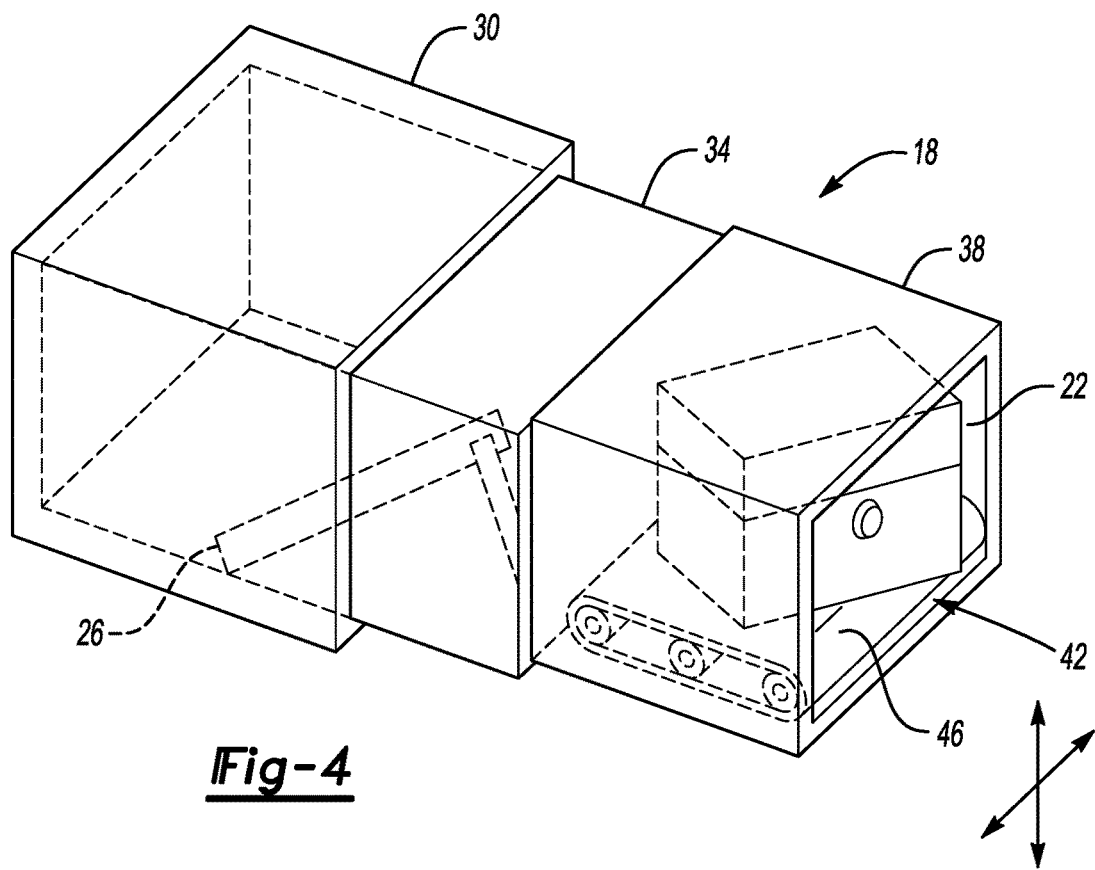
FIG. 4 illustrates a perspective view of the extension mechanism of FIG. 2 in an extended position.

In the exemplary embodiment, the extension mechanism 18 includes a folding support arm 26 utilized to move the extension mechanism 18 back and forth along a single axis between the retracted position of FIG. 3 and the extended position of FIG. 4. An actuator can be used to drive the folding support arm.

The extension mechanism 18 generally includes an outer box 30, a gearbox 34, and an inner box 38. A conveyor system 42 is disposed within the inner box 38. Within the extension mechanism 18, the item 22 is supported on an extension mechanism item carrying surface 46 of the conveyor system 42. The extension mechanism item carrying surface 46 faces vertically upward in this example. Vertical, for purposes of this disclosure, refers to the general orientation of the vehicle 14 and the locker 10 during operation and during ordinary use.

Figure 5:
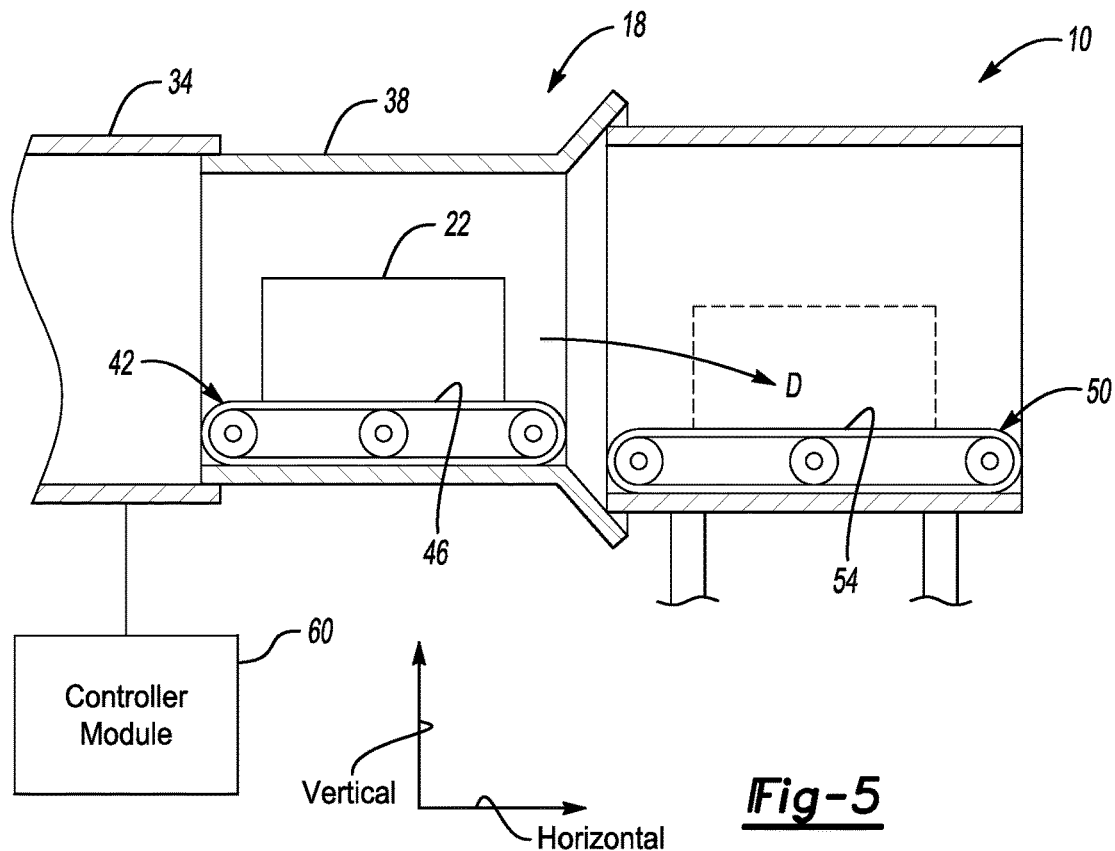
FIG. 5 shows a section view of selected portions of the extension mechanism and the locker when an item is being transferred from the motor vehicle to the locker.

With reference to the cross-sectional view of FIG. 5, the locker 10 includes a conveyor system 50 having a locker item carrying surface 54 that faces vertically upward. The item 22, when within the locker 10, is positioned upon the locker item carrying surface 54 of the conveyor system 50.

In the exemplary embodiment, at least the inner box 38 of the extension mechanism 18 can be adjusted such that the extension mechanism item carrying surface 46 is positioned vertically higher than the locker item carrying surface 54 when an item is being transferred from the vehicle 14 to the locker 10. When an item is being transferred from the locker 10 to the vehicle 14, at least the inner box 38 of the extension mechanism 18 can be adjusted such the extension mechanism item carrying surface 46 is positioned vertically lower than the locker item carrying surface 54. Positioning the receiving surface lower than the delivering surface can help to avoid interference as the item is transferred.

In the example of FIG. 5, the item 22 is delivered from the vehicle 14 to the locker 10. The extension mechanism 18 is thus positioned relative to the locker 10 such that the extension mechanism item carrying surface 46 is vertically higher than the locker item carrying surface 54. In some examples, the extension mechanism item carrying surface 46 is about 0.5 inches higher than the locker item carrying surface 54.

After the extension mechanism 18 has properly positioned the extension mechanism item carrying surface 46 relative to the locker item carrying surface 54, the conveyor system 42 of the extension mechanism 18 can rotate to move the item 22 in the direction D. The conveyor system 50 of the locker 10 also rotates until the item 22 is appropriate positioned within the locker 10, as shown in broken lines in FIG. 5.

Making the extension mechanism item carrying surface 46 higher than the locker item carrying surface 54 can help to ensure that the item 22 is not bumped or obstructed when being transferred from the extension mechanism 18 of the vehicle 14 to the locker 10.

Figure 6:
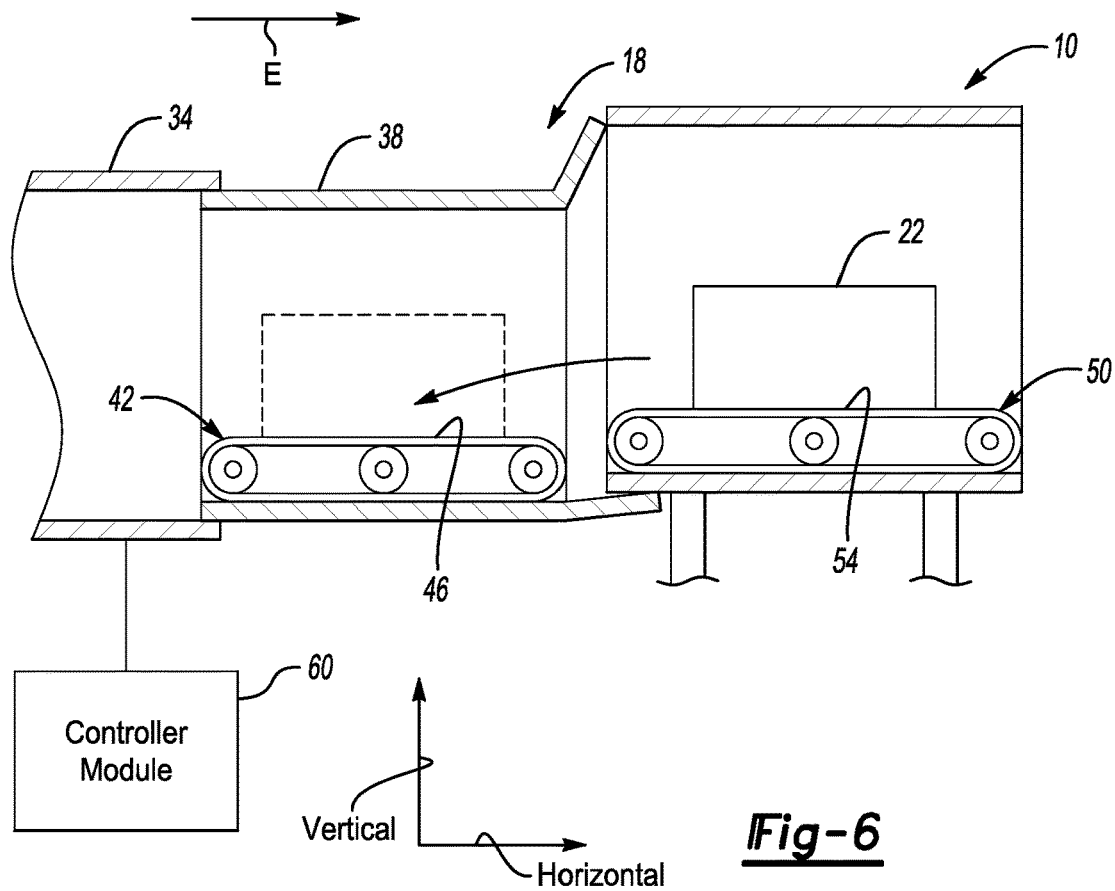
FIG. 6 shows the selected portions of FIG. 5 when the item is being transferred from the locker to the vehicle.

FIG. 6 shows a variation where the extension mechanism 18 is used when transferring the item 22 from the locker 10 to the vehicle 14. When such a transfer is required, the extension mechanism 18 is adjusted such that the extension mechanism item carrying surface 46 is vertically lower than the locker item carrying surface 54, say 0.5 inches lower.

The conveyor system 50 of the locker 10 can then be rotated to move the item 22 from the position within the locker 10 to the extension mechanism 18. The extension mechanism can then be rotated to position the item 22, as shown in the broken lines of FIG. 6.

In the exemplary embodiment, the gearbox 34 of the extension mechanism 18 is used to position the inner box 38, and thus the extension mechanism item carrying surface 46, vertically higher or lower. The gearbox 34 could include a rack gear to move the inner box 38 up and down.

In some examples, the gearbox 34 can be used to tilt the inner box 38 about a vertical axis. The tilting provides yaw control to the extension mechanism 18 and the inner box 38 of the extension mechanism 18, which can be useful when, for example, the vehicle 14 is parked on an incline.

A controller module 60 can control the gearbox 34 to adjust the vertical height of the inner box 38 as well as to tilt the inner box 38. The controller module 58 could receive inputs from various sensors of the vehicle 14, locker 10, or both. As an example, Bluetooth Low Energy (BLE) transmitter tags and global positioning satellite antennas could be used to indicate a position of the locker 10 to appropriate receivers of the vehicle 14. Cameras could also be utilized within the locker 10, the vehicle 14, or both to facilitate alignment of the extension mechanism 18 relative to the locker 10. Positioning the extension mechanism 18 can utilize inputs from, for example, ultrasonic sensors, which may provide distance information. Targets, such phosphor painted targets, could be on the vehicle 14, the locker 10, or both. The targets can be illuminated by an ultraviolet light to assist with alignment.

Figure 7:
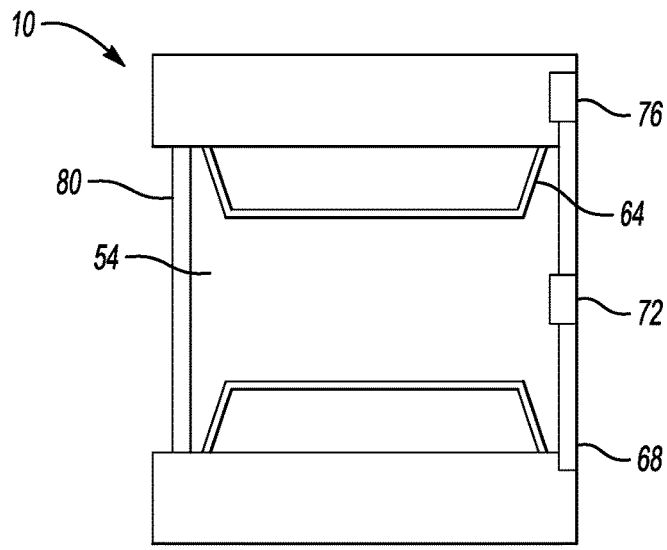
FIG. 7 shows a top and section view of the locker with a user access door in a closed position.
Figure 8:
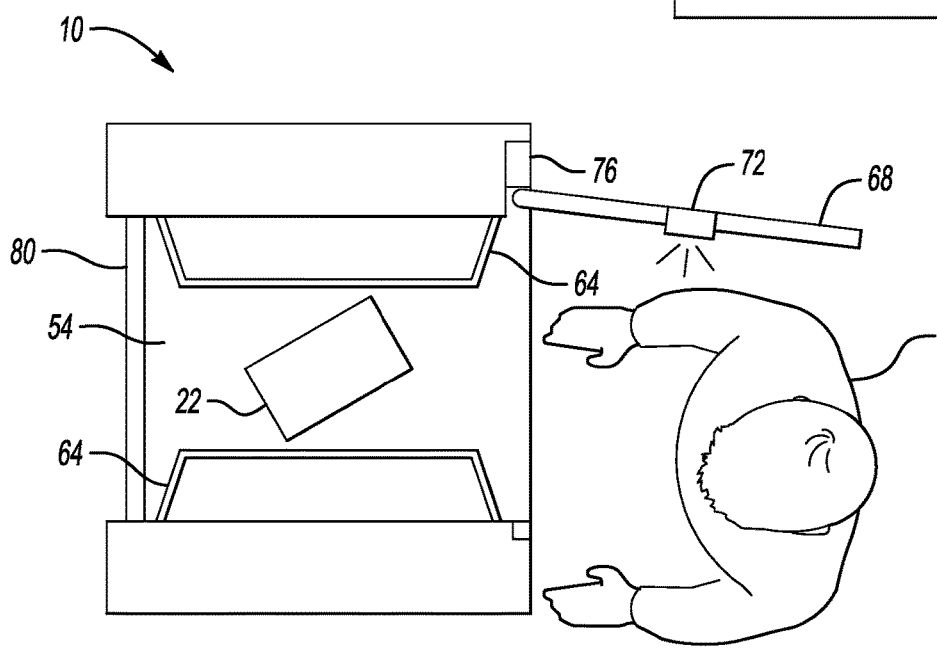
FIG. 8 shows the top and section view of FIG. 7 with the user access door is in an open position and when an item is placed within the locker.
Figure 9:
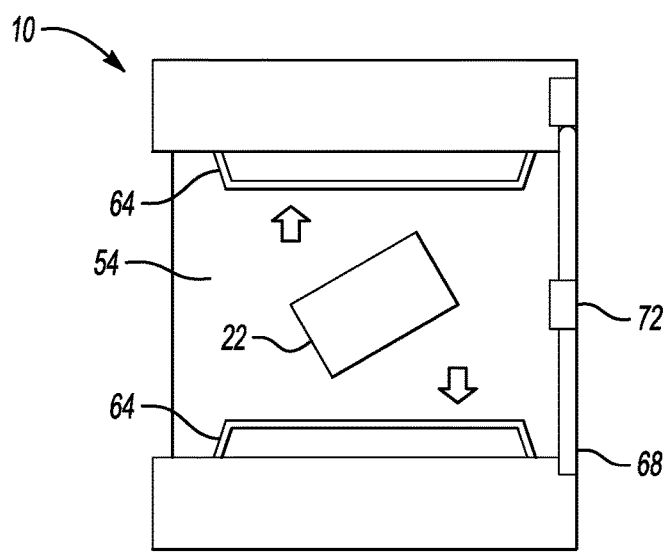
FIG. 9 shows the top and section view of FIG. 7 when the item is within the locker and a vehicle door in an open position.

With reference to FIGS. 7-9, the locker 10 includes at least one retractable alignment side 64 that can help to properly position the item 22 for transport from the locker 10 to the vehicle 14. The locker 10, in addition to the conveyor system 50 and the alignment side 64, further includes a user access door 68, a camera system having a lens 72, an access control interface 76, and a vehicle access door 80.

A user 84 first interfaces with the access control interface 76 to cause the user access door 68 to open as shown in FIG. 8. The access control interface 76 may be a touchscreen interface that receives a particular code input by the user 84. The code authorizes the opening of user access door 68. The access control interface 76 could further accept payment information and relay instructions to the user 84 about how the locker 10 can be used.

The user access door 68 can automatically release in response to appropriate input on the access control interface 76. Ordinarily, the user access door 68 can be spring biased toward the closed position of FIG. 6. When opening is authorized, the user access door 68 can be held in the open position of FIG. 8 by, for example, a solenoid detent. Holding the door utilizing the solenoid can help to ensure that the user access door 68 will be able to move back to the closed position if the user access door 68 is left by the user 84 in the open position. Further, holding the user access door 68 with the solenoid can reliably position the door.

The lens 72 of the camera is mounted to the user access door 68 such that the lens 72 moves with the user access door 68 back and forth between the closed position of FIG. 7 and the open position of FIG. 8. When the user access door 68 is in the open position, the camera system may, in response to movement detected by a sensor for example, capture an image of the user 84 placing the item 22 within the locker 10. The image could be saved and accessed later, if required.

As to the at least one alignment side 64, the example locker 10 includes two. Each of the example alignment sides 64 is disposed along a side and extend horizontally from user access door 68 to the vehicle access door 80. The alignment sides 64, in the exemplary embodiment, each extend vertically from a floor of the locker 10 to a ceiling of the locker 10. The sides can retract from the extended position of FIG. 8 to the retracted position of FIG. 9 by moving about two inches.

Each of the alignment sides 64 is positioned in an extended position as the user 84 places the item 22 within the locker 10. After the item 22 is placed within the locker 10 and the user access door 68 returns to the closed position as shown in FIG. 9, the alignment sides 64 are retracted outwards away from the item 22.

The alignment sides 64 in the extended position limit the areas within the locker 10 that are available to place the item 22. The alignment sides 64 in the extended position ensure that the item 22 is, horizontally, properly positioned within the locker 10 by the user 84. Properly positioned, for purposes of this disclosure, means that the item 22 is in a position appropriate for transfer from the locker 10 to the vehicle 14 via the extension mechanism 18. Even if the item 22 is relatively large, such that the user 84 has to jam the item between the alignment sides 64 in the extended position of FIG. 8, the item 22 will be transferable from the locker 10 to the vehicle 14.

When the item 22 is within the locker 10 and the user access door 68 is in the closed position as shown in FIG. 9, the lens 72 can be used to capture images of the item 22 and the interior of the locker 10. The lens 72 may capture an image indicating that the item 22 is too big for transport. For example, if the item 22 extends within, say 1 inch of a ceiling of the locker 10, the locker 10 may reject the item as not being transferable to the vehicle 14. The lens 72 can be a wide angle lens, for example.

When the user access door 68 is in the closed position, the lens 72 can also document cleanliness of the interior of the locker 10. An interior of the locker 10 can be painted white to assist in image clarity.

In FIG. 9, the vehicle access door 80 has been moved to an open position suitable for conveying the item 22 to the vehicle 14 through the opening. The vehicle access door 80 is a rollup door in the exemplary embodiment. The vehicle access door 80 can be moved to an open position after the extension mechanism 18 has been positioned near the locker 10 as shown in FIGS. 5 and 6.

The vehicle access door 80 can face a street. The user access door 68 can be on an opposite side of the locker 10 facing a building, for example.

The locker 10 can include a battery, such as a lithium ion battery, that powers the movement of the user access door 68, the alignments sides 64, the vehicle access door 80, or some combination of these. Battery powering the locker 10 can provide flexibility with where the locker 10 is located because power lines do not need to be run to the locker 10.

With reference now to FIG. 10, an exemplary method 100 of transferring an item from a locker to a vehicle begins at a step 104.

Next, at a step 108, the extension mechanism 18 is extended toward the locker and adjusted such that an extension mechanism item carrying surface is substantially centered with the locker and about one-half inch lower than a locker item carrying surface. A power transfer from the vehicle to the battery of the locker can also begin at a step 108. The power transfer can be a wireless transfer of power, in some examples. After the vehicle has sufficiently charged the battery, the vehicle access door can be raised to permit movement of the item from the locker to the vehicle.

Next, at a step 112, the conveyor systems in the locker and the vehicle are turned on, which causes the item to move from the locker to the extension mechanism of the vehicle.

Next, at a step 116, transfer of the item is confirmed. The transfer could be confirmed using, for example, a camera of the locker. The camera can capture an image indicating that the item is fully within the extension mechanism. Pattern recognition techniques could be applied to make this confirmation.

Next, a step 120 documents that the package has been picked up from the locker. One or more cameras could be used to record at least one image indicating that the interior of the locker is empty. The image may confirm that the interior of the locker is clean. If not, the locker could be removed from service. The confirmation information could be communicated to a server, such as a cloud-based server. If the locker lacks direct communicative access to the cloud-based server, the vehicle can provide a link for the locker.

At a step 124, the extension mechanism is retracted. Prior to the retracting, the vehicle access door may rolled back to the closed position. Further, if further charging of the battery of the locker is required, the extension mechanism may stay in the extended position until that charging is completed.

Next, at a step 128, the vehicle can move to the next delivery or pickup location. The vehicle can move autonomously to the next location in some examples.

With reference now to FIG. 11, an exemplary method 200 of how a user interact with the locker to initiate a transfer of an item to the vehicle begins at a step 204.

Next, at a step 208, the user accesses the interior of the locker. The user can, for example, interface with a touchscreen of the locker by entering a code to authorize the user to utilize the locker. Authorization could be via a Phone-as-a-Key technology in another example.

Next, at a step 212, alignment sides within the locker is extended and instructions are relayed to the user. The instructions could be displayed on a touchscreen of the locker. The instructions can detail how the user should interface with the locker to deposit the package.

Next, at a step 216, the user access door is opened and a camera, for example, captures images of the user, and the user placing the item within the locker.

Next, at a step 220, the locker 10 waits for the user access door to move to the closed position, and then retracts the alignment sides. The user access door may move to closed automatically after expiration of a certain time period.

Next, at a step 224, a camera can captures an image of an interior of the locker to confirm whether or not the item is contacting an undesirable area of the locker, such as a ceiling of the locker. If such contact is detected, the locker may communicate an alert to the user.

If not, the method moves to a step 228 where the method ends and the item is ready for pickup by a vehicle.

With reference now to FIG. 12, an example method 300 illustrates a method of transferring a package from the vehicle to the locker. The method 300 begins at a step 304.

Next, at a step 308, the method 300 confirms that the extension mechanism is appropriately positioned. In particular, the step 308 can ensures that the extension mechanism has a locker item carrying surface that is vertically elevated relative to a locker item carrying surface. At the step 308, the door of the locker can be fully opened after such confirmation is received.

Next, at a step 312, the conveyor systems within both the extension mechanism and the locker are turned on to transfer the package from the vehicle to the locker.

Next, at a step 316, a transfer of the item is confirmed. The transfer could be confirmed using, for example, a camera of the locker. The camera can capture an image indicating that the item is fully within the extension mechanism. Pattern recognition techniques could be applied to make this confirmation.

Next, a step 320 documents that the package has been picked up from the locker. One or more cameras could be used to record at least one image indicating that the interior of the locker is empty.

Next, at a step 324, the door of the locker is rolled up. At the step 324, a battery state of charge can also be assessed and compared to a desired target. Based on the comparison, the vehicle can begin or continue a wireless charge of a battery within the locker if required.

Next, at a step 328, the locker is ready for the next transfer of an item from vehicle or user.

Features of the disclosed examples include, in some exemplary embodiments, the adjustment of a conveyor height depending on whether the conveyor is delivering or receiving a transferred item. Another aspect of the present disclosure includes a locker having alignment sides that retract to facilitate proper placement of the item in the locker. Yet another feature includes photographing a user that is depositing an item in the locker.

The locker can receive and transfer information via inductive coupling, Bluetooth, or Bluetooth Low Emission communications. The vehicle can charge a battery of the locker during both delivery and pickup of items from the locker keeping the locker battery powered can ensure that the locker can be easily positioned in multiple locations without requiring extensive rewiring.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of transferring an item between a motor vehicle and a locker, comprising:
   extending an extension mechanism between a motor vehicle and a locker, the extension mechanism including a conveyor system having an extension mechanism item carrying surface, the locker including a conveyor system having an locker item carrying surface;
   assessing whether the motor vehicle is receiving an item from the locker, or transferring an item to the locker;
   when the item is to be transferred from the locker to the motor vehicle, positioning the extension mechanism relative to the locker such that the extension mechanism item carrying surface is vertically lower than the locker item carrying surface; and
   when the item is to be transferred from the motor vehicle to the locker, positioning the extension mechanism relative to the locker such that the extension mechanism item carrying surface is vertically higher than the locker item carrying surface.

2. The method of claim 1, further comprising extending the extension mechanism from the motor vehicle to the locker.

3. The method of claim 1, further comprising retracting at least one retractable alignment side within the locker and then transferring the item from the locker to the motor vehicle.

4. The method of claim 1, further comprising, prior to the extending and assessing, receiving the item within the locker through a user opening of the locker, wherein a user access door in a closed position blocks the user opening, and the user access door in the open position reveals the user opening.

5. The method of claim 4, further comprising capturing a picture of an individual placing the item within the locker using a camera that is mounted to the user access door.

6. The method of claim 5, further comprising, after closing the user access door, using the camera to capture a picture of the item within the locker.

7. The method of claim 6, further comprising extending the extension mechanism from the motor vehicle to the locker, retracting at least one retractable alignment side within the locker, and, after the retracting transferring the item from the locker to the motor vehicle.

8. A method of transferring an item between a motor vehicle and a locker, comprising:
  moving a user access door from a closed position to an open position, the user access door in the closed position blocking the user opening, the user access door in the open position revealing the user opening;
  receiving an item within a locker, the item moved through the user opening in the locker when the user access door is in the open position;
  when the user access door is in the open position, using a lens to capture an image of an individual placing the item in a locker; and
  when the user access door is in the closed position, using the lens to capture an image of the item within the locker.

9. The method of claim 8, further comprising aligning the item within the locker using at least one retractable alignment side of the locker.

10. The method of claim 8, wherein the lens is mounted to user access door and configured to move with the user access door back and forth between the open position and the closed position.

11. The method of claim 8, further comprising operating a conveyor system of the locker to move the item from the locker to a conveyor of an extension mechanism that extends from a motor vehicle.

12. The method of claim 11, wherein the conveyor of the extension mechanism is aligned relative to the locker such that an item receiving surface of the conveyor of the extension mechanism is vertically lower than an item delivering surface of the conveyor of the locker.

13. An item transferring system, comprising:
  an extension mechanism that can extend between a motor vehicle and a locker; and
  a conveyor system of the extension mechanism having an extension mechanism item transferring surface, the extension mechanism automatically aligned relative to the locker such that:
    when an item is to be transferred from the locker to the motor vehicle, the extension mechanism item carrying surface is vertically lower than a locker item carrying surface of a conveyor system of the locker,
    when the item is to be transferred from the motor vehicle to the locker, the extension mechanism item carrying surface is vertically higher than the locker item carrying surface.

14. The item transferring system of claim 13, further comprising the extension mechanism as part of the motor vehicle.

15. The item transferring system of claim 14, wherein the motor vehicle is an autonomous motor vehicle.

16. The item transferring system of claim 13, further comprising the locker and at least one retractable alignment side of the locker.

17. The item transferring system of claim 13, further comprising the locker, at least one user access door of the locker, and at least one lens mounted to the user access door, wherein,
  when the user access door is in an open position, the lens is configured to capture an image of an individual placing the item in a locker, and,
  when the user access door is in a closed position, the lens is configured to capture an image of the item within the locker.

18. The item transferring system of claim 17, wherein the user access door in the closed position blocks the user opening, and the user access door in the open position reveals the user opening.

19. The item transferring system of claim 17, further comprising the locker and at least one retractable alignment side of the locker.

\* \* \* \* \*